United States Patent [19]

Morikawa

[11] Patent Number: 4,488,528
[45] Date of Patent: Dec. 18, 1984

[54] SYSTEM FOR CONTROLLING THE IGNITION TIMING OF A COMBUSTION ENGINE

[75] Inventor: Kouji Morikawa, Naritahigashi, Japan

[73] Assignee: Fuji Jukogyo Kabushiki Kaisha, Tokyo, Japan

[21] Appl. No.: 587,739

[22] Filed: Mar. 8, 1984

[30] Foreign Application Priority Data

Mar. 12, 1983 [JP] Japan ................................. 58-41123

[51] Int. Cl.³ .............................................. F02P 5/04
[52] U.S. Cl. .................................................. 123/425
[58] Field of Search ...................... 123/425, 435, 414; 73/35

[56] References Cited

U.S. PATENT DOCUMENTS 3,903,856  9/1975  McDougal et al. ................. 123/425
4,304,203 12/1981  Garcea et al. ................... 123/425 X
4,417,556 11/1983  Latsch ............................. 123/425
4,444,172  4/1984  Sellmaier et al. .................. 123/425

Primary Examiner—Tony M. Argenbright
Attorney, Agent, or Firm—Martin A. Farber

[57] ABSTRACT

A system for controlling the ignition timing of an engine has a probe provided on the wall of a cylinder of the engine opposite the piston in the cylinder. A capacitance-to-voltage converting circuit is provided for measuring the crank angle of the engine by the capacitance between the probe and the top of the piston and for producing an output dependent on the crank angle, and a second circuit is provided for measuring the velocity of flame propagation in the cylinder by detecting the ionization current flowing between the probe and the cylinder and for producing an output when the velocity is very high. An ignition timing control circuit is responsive to output of the converting circuit and second circuit for retarding the ignition timing so as to prevent the knocking of the engine.

4 Claims, 4 Drawing Figures

SYSTEM FOR CONTROLLING THE IGNITION TIMING OF A COMBUSTION ENGINE

BACKGROUND OF THE INVENTION

The present invention relates to a system for controlling the ignition timing of an internal combustion engine, and more particularly to a system for controlling the ignition timing to proper value without occurring the knocking of the engine.

The ignition timing is advanced according to the speed of the engine in order to increase engine power. However, if the ignition timing is largely advanced, knocking of the engine will occur. Therefore, the advance must be controlled so as not to occur the knocking. In order to prevent the knocking, it is necessary to provide sensing means for monitoring operating conditions causing the knocking and to control the ignition timing according to the monitor. Operating conditions causing the knocking can be detected by sensing the vibration of the engine. However, such an indirect detection can not provide an exact control of the ignition timing. Therefore, it is desirable for the exact control to directly detect operating conditions in cylinders.

SUMMARY OF THE INVENTION

The object of the present invention is to provide a system for controlling the ignition timing to proper value by exactly sensing operating conditions of an engine. In order to sense operation conditions, crank angle is sensed by capacitance between the top of a piston and the cylinder head and the velocity of flame propagation in a cylinder is detected by measuring the ionization current in the flame. With such means for directly sensing operating conditions which will introduce the knocking, the ignition timing is exactly controlled to proper value.

According to the present invention, there is provided a system for controlling the ignition timing of a combustion engine comprising a probe provided on the wall of a cylinder of the engine opposite the piston in the cylinder. A first circuit is provided for measuring the crank angle of the engine by the capacitance between the probe and the top of the piston and for producing an output dependent on the crank angle, and a second circuit is provided for measuring the velocity of flame propagation in the cylinder by detecting the ionization current flowing between the probe and the cylinder and for producing an output when the velocity is very high.

An ignition timing control circuit respond to outputs of the first and second circuits for retarding the ignition timing so as to prevent the knocking of the engine.

The other objects and features of this invention will be apparently understood from the following description with reference to the accompanying drawings.

DETAILED DESCRIPTION OF THE PREFERRED EMBODIMENT

Figure 1:
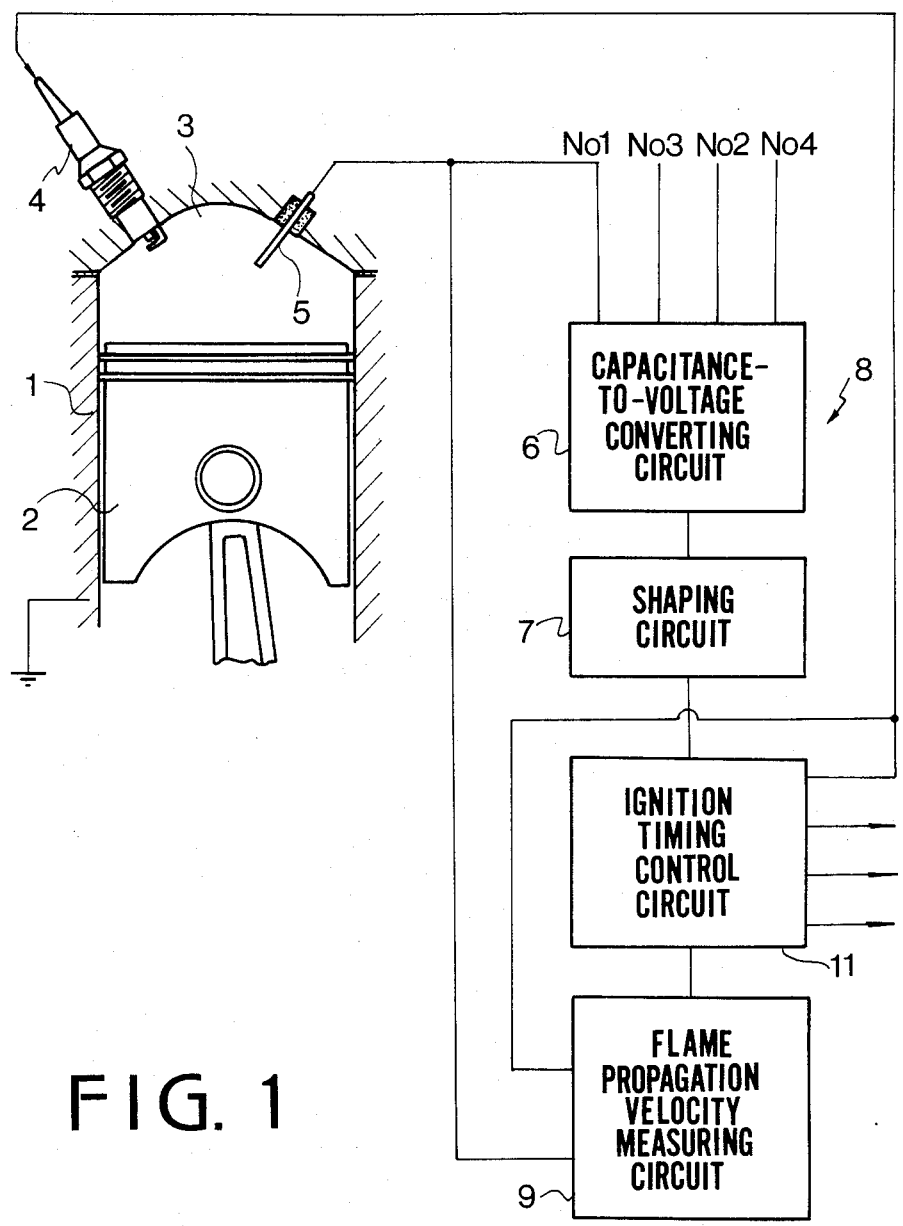
FIG. 1 is a block diagram showing a system according to the present invention.

Referring to FIG. 1 showing one cylinder portion of an internal combustion engine, the engine comprises a cylinder 1, piston 2, combustion chamber 3, spark plug 4 and probe 5 projecting into the combustion chamber 3 toward the top of the piston 2. The probe 5 constitutes a capacitor together with the top of the piston for sensing the position of the piston 2, that is the crank angle, and for sensing the velocity of flame propagation by measuring ionization current as described hereinafter in detail.

The control system comprises a crank angle measuring circuit 8 comprising a capacitance-to-voltage converting circuit 6 and a shaping circuit 7, a flame propagation velocity measuring circuit 9, and an ignition timing control circuit 11 responsive to outputs of shaping circuit 7 and measuring circuit 9. In the other cylinders of the engine, probes 5 are provided to send signals to the control system.

Figure 2:
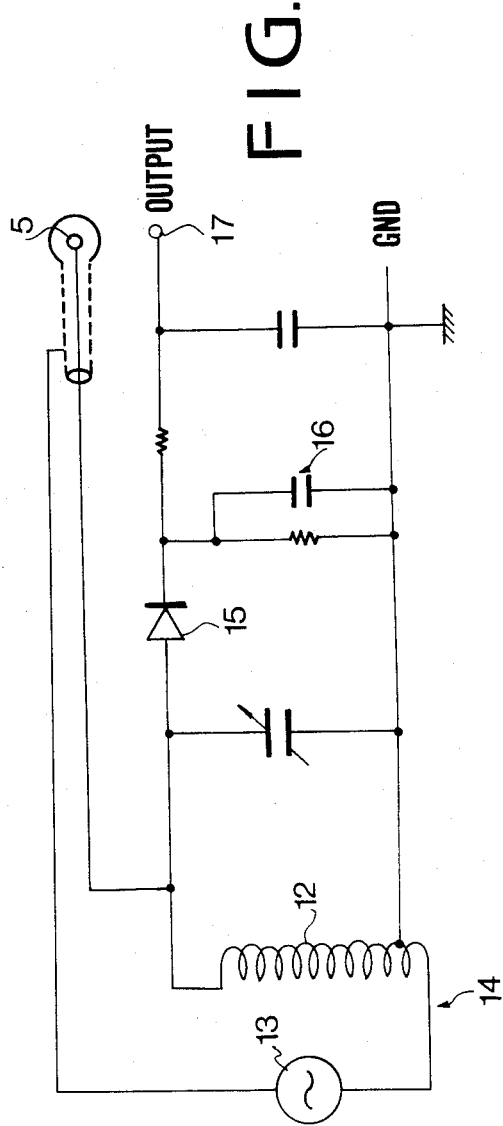
FIG. 2 is a circuit for measuring the crank angle of an engine.

Referring to FIG. 2 showing a part of crank angle measuring circuit 8, the circuit comprises a coil 12 and an oscillator 13 connected to the probe 5 and the ground to form an LC resonant circuit 14. The LC resonant circuit is connected to an output terminal 17 through a diode 15 and a low-pass filter 16. The output at the terminal 17 is shaped by the shaping circuit 7 and the circuit produces an output signal at the top dead center of the piston.

Figure 3:
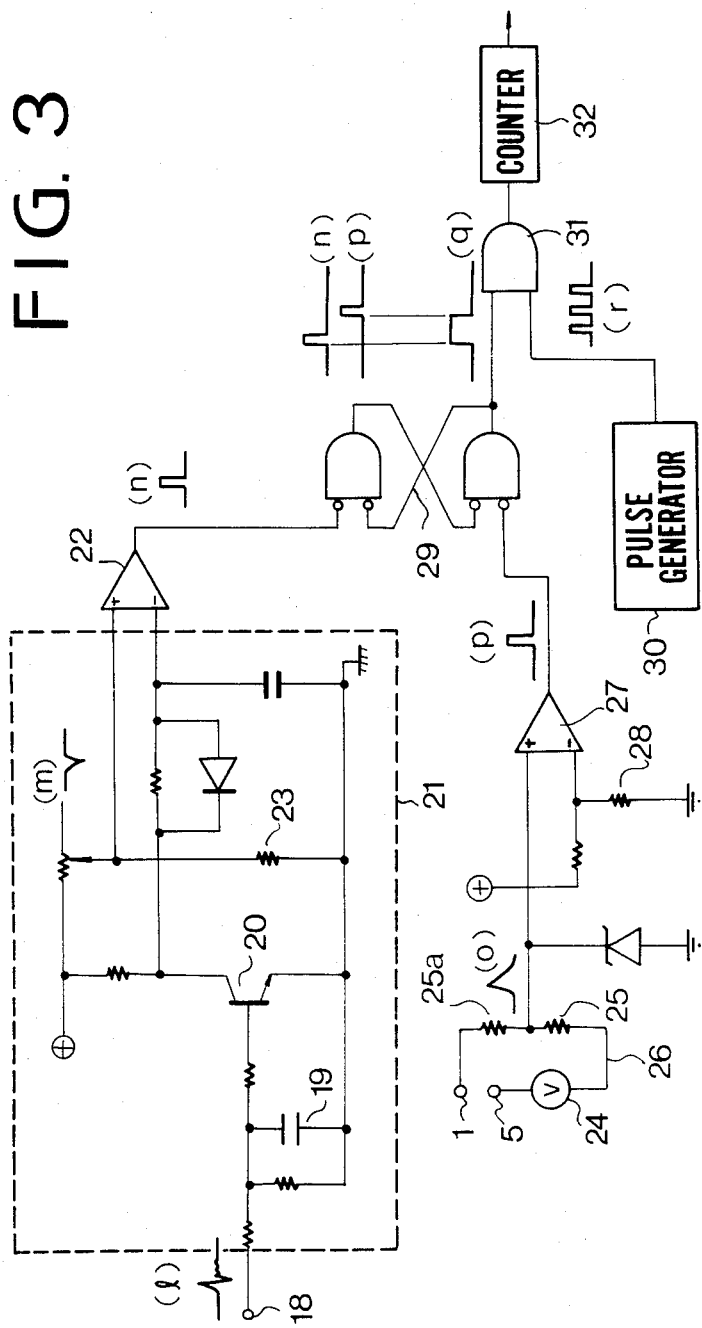
FIG. 3 is a circuit for measuring the velocity of flame propagation.

Referring to FIG. 3 showing a flame propagation velocity measuring circuit, ignition pulses l are applied to an input terminal 18 and the pulses are shaped by a shaping circuit 21 comprising an integrating circuit 19 and a transistor 20. The output of the shaping circuit 21 is connected to an inverting input of a comparator 22. The non-inverting input of the comparator 22 is applied with a reference voltage by a resistor 23.

On the other hand, between the cylinder 1 (as the ground) and probe 5, resistors 25, 25a and direct current source 24 are connected in series to form an ionization current sensing circuit 26. The output of the sensing circuit is connected to the non-inverting input of a comparator 27. The inverting input of the comparator 27 is applied with a reference voltage by a resistor 28. The output of the comparator 22 is connected to the set terminal of a flip-flop 29 and the output of the comparator 27 is connected to the reset terminal of the flip-flop. The output of the flip-flop 29 and output of a pulse generator are connected to an AND gate 31.

Figure 4:
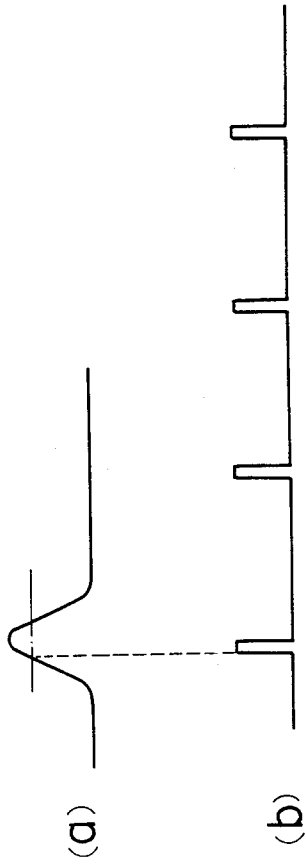
FIG. 4 shows waveforms at different locations of the circuit of FIG. 3.

In operation, when the piston 2 reaches the top dead center, the capacitance between the probe 5 and the top of the piston 2 becomes maximum, so that the capacitance-to-voltage converting circuit 6 produces an output at the output terminal 17 as shown in FIG. 4(a). The output is shaped by the shaping circuit 7 to produce a signal shown in FIG. 4(b). If threshold level is lowered, crank angle before the top dead center is detected. Crank angle signals are applied from all cylinders (for example four cylinders) to the ignition timing control circuit 11. The ignition timing control circuit produces an ignition signal in dependency on the crank angle signals and engine speed thereby to control the ignition timing to proper value.

On the other hand, ignition pulses l occur in dependency on the ignition, which are applied to the input terminal 18 of the flow propagation velocity measuring circuit of FIG. 3. The ignition pulse is shaped into a pulse m by the shaping circuit 21. The pulse m is compared with the reference voltage by the comparator 22, so that a shaped ignition pulse n is produced. The pulse n is applied to the flip-flop 29 to set it.

When air-fuel mixture in the cylinder 1 flames by the ignition pulse, ionization current flows between the probe 5 and the cylinder 1, having a waveform of o. The waveform o is converted to a pulse p by the comparator 27. The pulse p acts to reset the flip-flop 29. Thus, the flip-flop produces an output pulse q having a duration between the set by the pulse n and the reset by the pulse p. The AND gate 31 is applied with the output pulse q and with clock pulses r generated by the pulse generator 30. Accordingly, the AND gate produces pulses during the duration of the pulse q. The pulses are counted by a counter 32, so that the velocity of flame propagation is detected. When the velocity is so high as to occur the knocking, the duration of pulse q is very short, resulting in small number of output pulses of AND gate 31. Thus, conditions which will occur the knocking of the engine can be detected by the output of the counter 32. The ignition timing control circuit 11 operates to retard the ignition timing in dependency on the output of the counter 32 so as to prevent the knocking.

While the presently referred embodiment of the present invention has been shown and described, it is to be understood that this disclosure is for the purpose of illustration and that various charges and modifications may be made without departing from the spirit and scope of the invention as set forth in the appended claim.

What is claimed is:

1. A system for controlling the ignition timing of a combustion engine comprising:

a probe provided on the wall of a cylinder of the engine opposite the piston in the cylinder;

a first circuit for measuring the crank angle of the engine by the capacitance between said probe and the top of the piston and for producing an output dependent on the crank angle;

a second circuit for measuring the velocity of flame propagation in the cylinder by detecting the ionization current flowing between said probe and the cylinder and for producing an output when the velocity is very high;

an ignition timing control circuit responsive to outputs of said first and second circuits for retarding the ignition timing so as to prevent the knocking of the engine.

2. The system for controlling the ignition timing of a combustion engine according to claim 1 wherein said first circuit comprises a capacitance-to-voltage converting circuit and a shaping circuit for shaping the output of the converting circuit.

3. The system for controlling the ignition timing of a combustion engine according to claim 1 wherein said second circuit comprises an ignition pulse generating circuit responsive to ignition in a cylinder for producing a shaped ignition pulse, and a comparator operative to produce a velocity output when the ionization current exceeds a predetermined value, and a measuring circuit for measuring the duration between said shaped ignition pulse and said velocity output.

4. The system for controlling the ignition timing of a combustion engine according to claim 3 wherein said measuring circuit comprises a flip-flop responsive to said shaped ignition pulse and said velocity output for producing an output during the ignition pulse and velocity output, a gate circuit for producing pulses during said output of the flip-flop, and a counter for counting the pulses from said gate circuit.

* * * * *